United States Patent [19]

Neil

[11] Patent Number: 4,659,171

[45] Date of Patent: Apr. 21, 1987

[54] INFRARED AFOCAL REFRACTOR TELESCOPE

[75] Inventor: Iain A. Neil, Strathblane, Scotland

[73] Assignee: Barr & Stroud Limited, Glasgow, Scotland

[21] Appl. No.: 731,576

[22] Filed: May 7, 1985

[30] Foreign Application Priority Data

May 22, 1984 [GB] United Kingdom ............... 8413096

[51] Int. Cl.$^4$ .................... G02B 15/16; G02B 1/02
[52] U.S. Cl. ............................ 350/1.2; 350/560
[58] Field of Search ............... 350/1.2, 1.4, 560, 474

[56] References Cited

U.S. PATENT DOCUMENTS

| | | | |
|---|---|---|---|
| 3,947,084 | 3/1976 | Noyes | 350/560 |
| 4,411,488 | 10/1983 | Neil | 350/1.4 |
| 4,486,069 | 12/1984 | Neil et al. | 350/1.4 |

FOREIGN PATENT DOCUMENTS

| | | | |
|---|---|---|---|
| 2072871 | 7/1981 | United Kingdom | 350/1.2 |
| 2131973 | 6/1984 | United Kingdom | 350/1.2 |

*Primary Examiner*—Bruce Y. Arnold
*Attorney, Agent, or Firm*—Mason, Fenwick & Lawrence

[57] ABSTRACT

An infrared afocal refractor telescope (40) comprises a zoom system (27), a collecting system (28) and an eyepiece system (30) arranged in a common optical axis (26). The zoom system (27) is formed by a fixed objective lens component (K) and by a first lens component (H) mounted on a carriage (32) and by a second lens component (I,J) mounted on a carriage (31), the carriages (32,31) being separately movable along the optical axis (26). The movable lens components of the zoom system (27) each have the same sign of optical power and the variation in telescope magnification provided by selective positioning of the carriages (32,31) is at least 5:1 in range. The locus (34,33) of movement of each of the two movable lens components (H;I,J) renders the telescope athermalized.

5 Claims, 3 Drawing Figures

INFRARED AFOCAL REFRACTOR TELESCOPE

This invention relates to an infrared afocal refractor telescope.

The arrival of high performance infrared radiation detecting systems has led to a demand for high performance telescopes which for some applications require several alternative fields of view with continuity of imaging (i.e. zooming) during a field of view change. Further requirements are compactness (i.e. short overall length), mechanical and optical simplicity, image resolution throughout the range of fields of view, a relatively large zoom ratio, and a means for compensating the telescope against the effects of temperature to which infrared materials are particularly sensitive.

It is therefore an object of the present invention to provide an improved form of infrared afocal refractor telescope.

According to the present invention there is provided an infrared afocal refractor telescope comprising a zoom system, a collecting system and an eyepiece system aligned on a common optical axis, the zoom system being arranged to accept from object space radiation in the infrared waveband, the collecting system being arranged to form a real image from radiation delivered thereto by said zoom system, and the eyepiece system being arranged to deliver radiation from said image to a pupil in image space wherein said collecting system is formed by a single lens component which is fixedly located on said optical axis and said zoom system is formed by an objective lens component fixedly located on said optical axis and by first and second other lens components mounted on respective carriages and separately selectively positionable along said optical axis between said objective lens component and said single lens component, said first and second other lens components each having the same sign of optical power, said objective lens component having positive optical power, the variation in telescope magnification provided by selective positioning of said first and second other lens components being at least 5:1 in range, the locus of movement of said first and said second other lens component being substantially free of curl back, the arrangement being such that relatively small positional adjustments of said first and second other lens components renders the telescope athermalised.

Preferably said first and second other lens components each have negative optical power.

Conveniently each component of said zoom system is formed by a single lens element.

One example of how the carriages may be adjusted is disclosed in co-pending U.K. patent application No. 8315878 (Publication No. 2141260) where each of said carriages is positioned along said optical axis by a drive signal issued by a computational means having pre-programmed data relating to the optical characteristics of the elements of the telescope, and having manually-operable inputs for demanded focal distance, and magnification factor, and automatic continuous input of sensed temperature of the telescope.

The telescope of the present invention is optically and mechanically simple, relatively compact, and by virtue of the optical characteristics and zoom loci of the movable components is rendered insensitive to thermal effects. The telescope may be all spherical or may have aspherics and may also be easily colour-corrected by selection of materials. For example, all lens elements may be made of germanium except for a lens element in the first or second other lens component of the zoom system which may be made from any of the materials listed in Table V.

Embodiments of the present invention will now be described by way of example with reference to the accompanying schematic drawings and tables.

Figure 1:
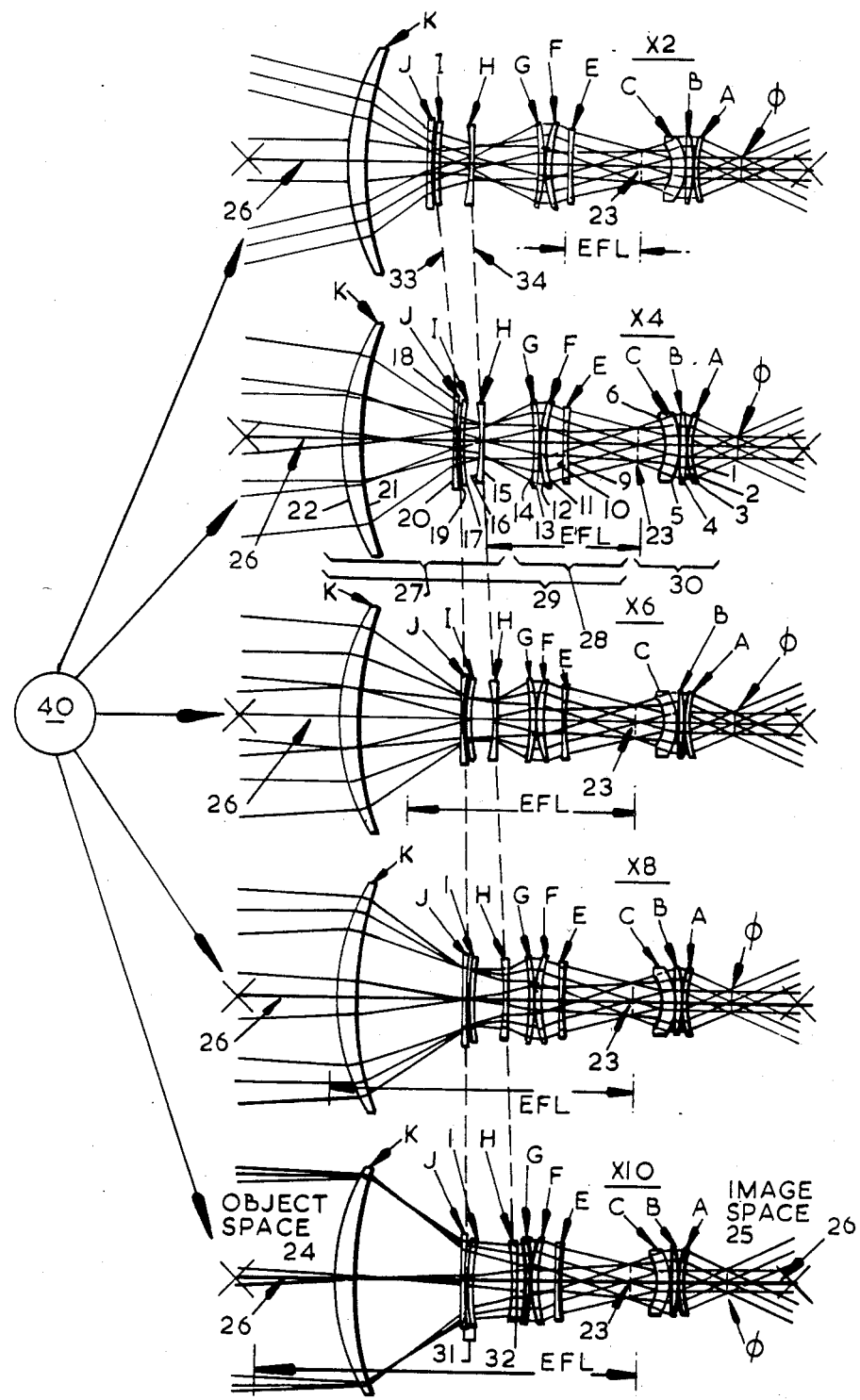
FIG. 1 illustrates a first telescope according to the present invention.

The telescope 40 shown in FIG. 1 is of variable magnification within the range X2 to X10 (i.e. the range is 5:1), the particular magnification factor depending upon the axial location of the movable components thereof and five magnification factors are depicted separately in FIG. 1.

The telescope 40 is formed by an objective lens assembly 29 and an eyepiece system 30. The objective lens assembly 29 comprises a zoom system 27 and a collecting system 28, systems 27, 28 and 30 being aligned on a common optical axis 26. Radiation from object space 24 is directed by the objective lens assembly 29 to form a real image 23 from which eyepiece system 30 relays the radiation to image space 25 via a pupil $\phi$. The magnification factor of the telescope 40 is within the range X2 to X10 and the drawing illustrates five separate magnification factors individually in the interests of clarity since each specific magnification factor is determined by specific positioning of the movable components of the zoom system 27 axially along axis 26.

The collecting system 28 is formed by a single component which in this embodiment is three lens elements E, F and G fixedly positioned on the optical axis 26 and having respective refractive surface pairs 9,10; 11,12; and 13,14. The zoom system 27 is formed by three components of which the first component (with respect to the collecting system 28) is formed by a single lens element H, the second component is formed by a pair of lens elements I,J forming a doublet (i.e. a closely spaced pair of lens elements) and the third or objective component is formed by a single lens element K. Lens elements H,I,J and K have respective refractive surface pairs 15,16; 17,18; 19,20; 21,22 and element K is fixedly located on the axis 26 but elements H,I and J are movable along the axis 26 to provide the zoom effect as will be explained. The eyepiece system 30 is formed by three lens elements A,B,C forming a triplet (i.e. three closely spaced lens elements) with respective refractive surface pairs 1,2; 3,4; 5,6 and is fixedly located on the optical axis 26.

In order to provide the variable magnification for the telescope 40 the first and second components of the zoom system 27 are each mounted on respective separate carriages 31 and 32 for axial movement along the optical axis 26 within the physical limits imposed by the presence of the third or objective component of system 27 (lens element K) and the collecting system 28 (lens element G) which are each fixedly located on the optical axis 26. In order to provide focus compensation for thermal effects a small adjustment in position may conveniently be made to at least one of the carriages 31 and 32.

Zoom system 27 is provided with refractive surfaces 15-22 of which all surfaces are either spherical or planar. This makes system 27 optically simple having a small number of lens elements and still enables system 27 to be compact with a large variable rang of fields of view (or magnifications).

The performance values for the telescope 40 having the Table I parameters are set forth in Table II for each of the five magnification factors from which it can be seen that the telescope is of high performance (i.e. near diffraction limited) over at least two-thirds of the field of view and is extremely compact.

The effective focal length (EFL) is denoted in the drawing for each magnification factor and illustrates that an increase in effective focal length from the minimum effective focal length is produced by separate movements of carriages 31 and 32 towards the collecting system 28, carriages 31 and 32 making a closest approach to each other at an intervening effective focal length (approximately X4 magnification) so that the maximum effective focal length is produced when the carriage 32 approaches the collecting system 28 and is limited by abutment. The locus of movement of carriage 31 is depicted by numeral 33 and that of carriage 32 by numeral 34.

Figure 2:
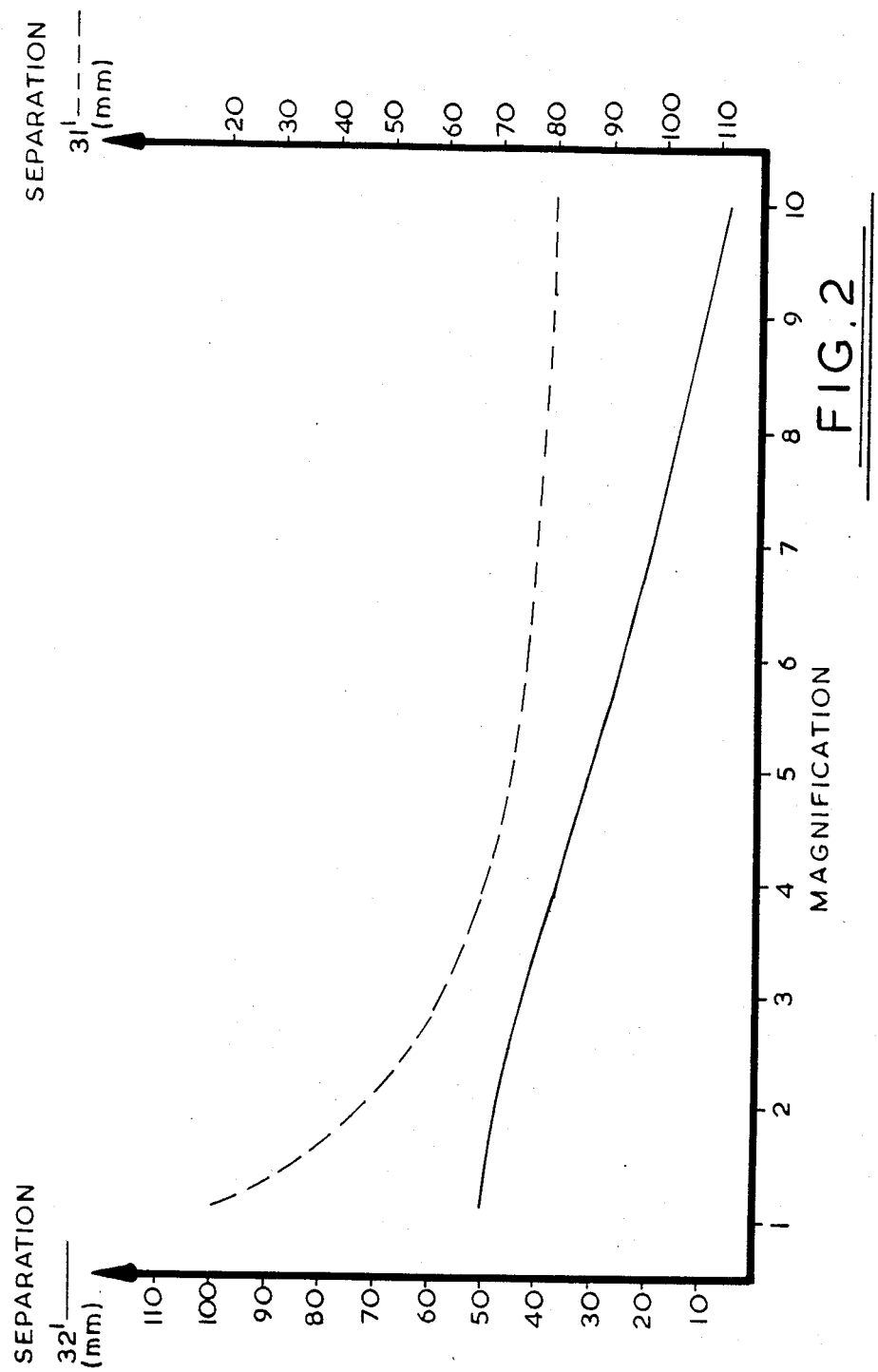
FIG. 2 illustrates separation curves for the movable components of FIG. 1.

FIG. 2 illustrates separation curves 32', 31' for carriages 32,31, respectively over the maximum magnification tion range of the FIG. 1 telescope which is X1.1 to X10, from which it will be seen that curve 32' (representing locus 34) is substantially linear whilst curve 31' (representing locus 33) is non-linear but is free from 'curl back'. 'Curl back' being the term used in the art to denote a directional reversal in the movement of a zoom component in traversing from its low magnification position to its high magnification position (or vice versa). In particular it will be noted that curve 31' consistently denotes increasing separation as magnification progressively increases from its lowest to its highest value. The rate of change of separation is greatest at low magnification values and is relatively small at higher magnification values.

As regards the optical powers of the lens elements of the zoom system 27 and the collecting system 28, elements K,G and F are each positively powered, J and I as a component is negatively powered and each of J and I is negatively powered and elements H and E are each negatively powered. In particular elements I and J together have an optical power of about 75% of that of element H. Because of the materials used to form the lens elements as set forth in Table I the telescope 40 accepts radiation in the 8-13 micrometer waveband and by virtue of the numeric values has a focus in the range 50 meters to infinity with minimal degradation of resolution, but if such degradation is acceptable focus down to 10 meters can be achieved. The telescope 40 is easily athermalised over the range $-10°$ C. to $+50°$ C. with minimal degradation in overall performance by relatively small positional adjustments of carriages 31, 32. For practical purposes if the resolution degradation is acceptable the range for thermal compensation can be increased to $-40°$ C. to $+80°$ C. but the telescope 40 displays transmission loss due to absorption of radiation by the germanium at the high temperature end of the range. The aperture diameter of the largest element of the zoom system is enlarged by less than 4% to accommodate pupil aberrations.

Figure 3:
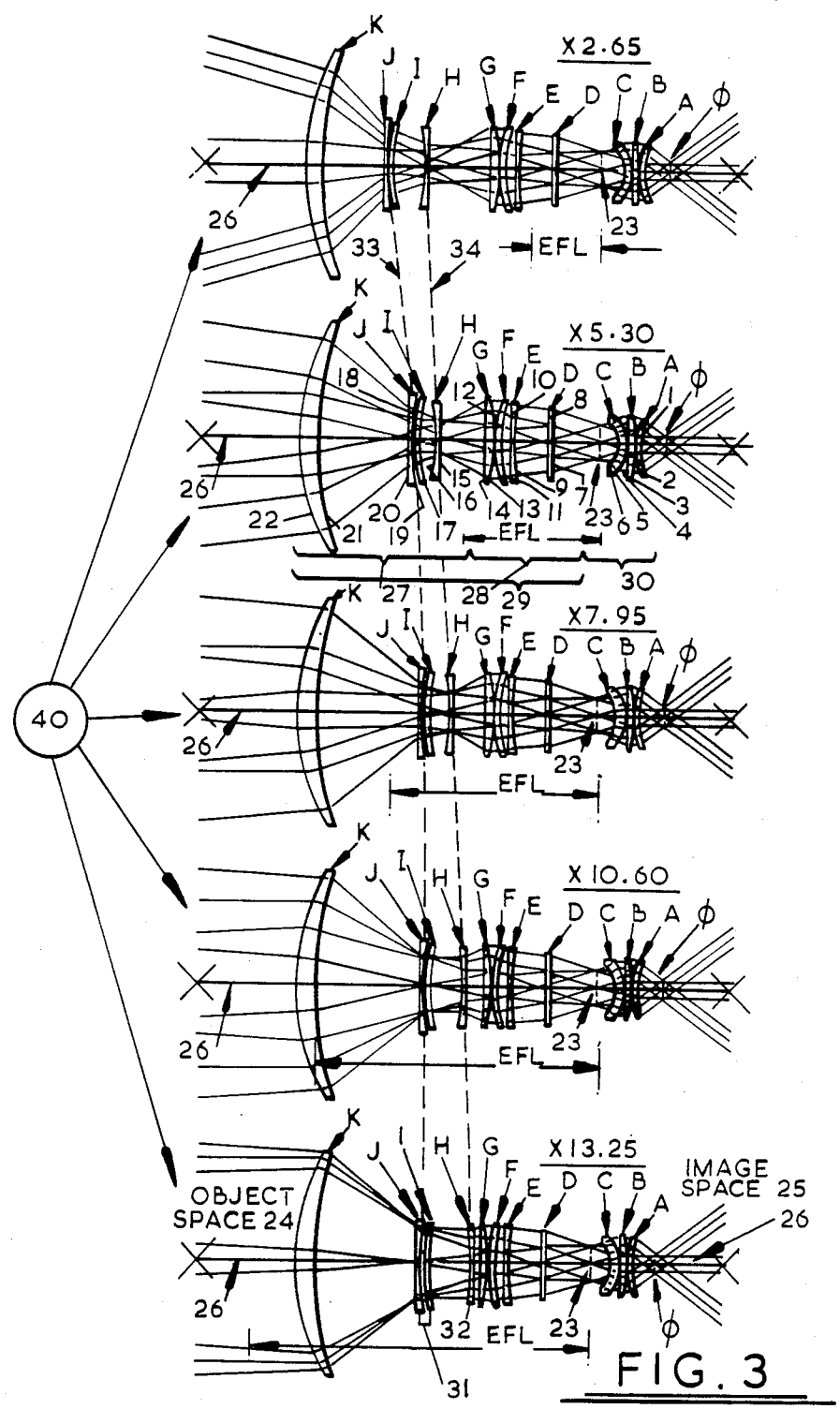
FIG. 3 illustrates a second telescope according to the present invention.

The telescope 40 illustrated in FIG. 3 is generally similar to that of FIG. 1 but is optimised for a different range of magnification factors (X2.65 to X13.25) and is provided with a four element (but single component) collecting system 28 in order to provide the required aberration correction. In the FIG. 3 telescope lens elements D,E,F and G form the one component collecting system 28 having refractive surfaces 7-14 and the zoom system 27 is formed by three components of which the first (with respect to the system 28) is a singlet lens element H having refractive surfaces 15, 16, the second component is a doublet formed by lens elements I,J having refractive surfaces 17-20 and the third or objective component is a singlet lens element having a single lens element K with refractive surfaces 21, 22.

In the FIG. 3 arrangement all refractive surfaces are spherical.

The parameter and material characteristics of the FIG. 3 telescope are set forth in Table III and the resolution particulars in Table IV. It will be appreciated that in Tables I and III the separations in germanium and zinc selenide and radii of curvature of the four elements H,I,J and K of system 27 of both embodiments are the same. Given only small differences of air separations and the maximum aperture diameters, the zoom system 27 may be considered common to two telescopes, which provide different fields of view and pupil diameters in image space. In both embodiments as set forth in Tables I to IV the zoom systems 27 may be scaled and optimised to provide a wide range of upper and lower effective focal lengths and magnification factors and if the largest magnification factor is sufficiently low, colour-correction may not be required in which case all lens components may be made of the same material such as germanium. It is also possible to optimise the eyepiece system 30 and collecting system 28 in such a way as to provide other fields of view and pupil diameters in image space thus making the telescope suitable for attachment to different detector systems which may or may not use scanning mechanisms.

It will be appreciated that to maintain a short overall length of telescope as shown in the drawing, the f-number at the internal real image 23 should be kept small e.g. less than 2.5.

It will also be appreciated that the telescope 40 of the two embodiments is optimised for focus on an object close to infinity and that change in the field of view (magnification) by movement of the carriages 31 and 32 can maintain the nominal focus. However, for an object at a distance other than infinity the telescope 40 requires to be focussed initially and this is conveniently achieved by movement of at least one of carriers 31 and 32. In each case after the initial focussing, according to the distance of the object, at least one of the carriers 31 and 32 may be moved within the physical space constraint for refocussing of the image in compensation of temperature variations and zoom system movements.

All data recited herein and in the tables is for a temperature of 20° C. and as regards Table V the V-values given are calculated from the standard formula $$V = \frac{\text{refractive index at 10 micrometers} - 1.0}{\text{refractive index at 8.5 micrometers} - \text{refractive index at 11.5 micrometers}}$$

and the f-number specified herein is derived from the formula $(2 \sin \theta)^{-1}$ where $\theta$ is the half angle of the cone formed by the axial pencil after refraction from the lens element on which the pencil is incident.

Although the two embodiments are optimised for high resolution over a 5:1 zoom range if the resolution degradation is acceptable the range for zooming can be increased to at least 9:1 the size of zoom range being limited by the physical constraints which the stationary components of the zoom system and collecting system impose on the two movable zoom components.

By virtue of the fact that carriers 31 and 32 are physically separated by an axial distance which for many situations has the same value at two different magnifications it is possible to use the zoom system 27 in a dual magnification mode only. Apart from the closest approach of carriers 31 and 32 which provide only one magnification a range of dual magnifications is available. In this case carriages 31 and 32 are locked to one another to form a single carriage which is selectively located in one or other of the two compatible positions which provide the resolution previously referred to. This arrangement of course does not provide continuous focus between magnifications but is mechanically simple having only one moving component and can provide a very large magnification ratio such as 9:1.

TABLE I

| Lens | Surface | Separation | Magnification | Radius of Curvature | Material | Maximum Aperture Diameter |
|---|---|---|---|---|---|---|
| Pupil* | 0 | 0 | any | Flat | Air | 15.30 |
| A | 1 | 33.21 | any | −68.58 | Air | 21.13 |
|  | 2 | 3.30 | any | −56.90 | Ge | 21.91 |
| B | 3 | 0.50 | any | 246.13 | Air | 22.85 |
|  | 4 | 3.80 | any | 14792.96 | Ge | 22.76 |
| C | 5 | 0.50 | any | 38.61 | Air | 21.87 |
|  | 6 | 10.07 | any | 34.19 | Ge | 17.57 |
| E | 9 | 73.92 | any | −233.38 | Air | 23.58 |
|  | 10 | 2.50 | any | −525.64 | Ge | 24.00 |
| F | 11 | 12.82 | any | −132.08 | Air | 28.45 |
|  | 12 | 5.10 | any | −78.31 | Ge | 29.15 |
| G | 13 | 0.50 | any | 176.02 | Air | 28.27 |
|  | 14 | 4.40 | any | 636.75 | Ge | 27.87 |
| H | 15 | 47.14 | ×2 | −1986.54 | Air | 25.40 |
|  |  | 35.89 | ×4 |  |  |  |
|  |  | 24.56 | ×6 |  |  |  |
|  |  | 14.50 | ×8 |  |  |  |
|  |  | 5.65 | ×10 |  |  |  |
|  | 16 | 2.30 | any | 151.64 | Ge | 24.93 |
| I | 17 | 24.78 | ×2 | −122.78 | Air | 27.78 |
|  |  | 13.25 | ×4 |  |  |  |
|  |  | 17.00 | ×6 |  |  |  |
|  |  | 24.25 | ×8 |  |  |  |
|  |  | 32.16 | ×10 |  |  |  |
|  | 18 | 2.30 | any | −256.79 | Ge | 28.57 |
| J | 19 | 2.30 | any | −303.94 | Air | 29.83 |
|  | 20 | 2.30 | any | −1010.46 | ZnSe | 30.69 |
| K | 21 | 45.58 | ×2 | −235.46 | Air | 77.48 |
|  |  | 68.36 | ×4 |  |  |  |
|  |  | 75.94 | ×6 |  |  |  |
|  |  | 78.75 | ×8 |  |  |  |
|  |  | 79.69 | ×10 |  |  |  |
|  | 22 | 13.50 | any | −155.60 | Ge | 79.51 |

*Maximum field angle at pupil = 46.4°.

TABLE II

Approximate R.M.S. Spot Sizes in Object Space* (milliradians)

| | Monochromatic at 10.0 micrometers | | | Polychromatic over 8.5–11.5 micrometers | | |
|---|---|---|---|---|---|---|
| | Field position as a fraction of the full field at pupil # | | | | | |
| Magnification | 0 | 0.4 | 0.8 | 0 | 0.4 | 0.8 |
| ×2 | 0.756 | 0.513 | 0.938 | 0.797 | 0.583 | 1.004 |
| ×4 | 0.380 | 0.247 | 0.494 | 0.389 | 0.264 | 0.502 |
| ×6 | 0.273 | 0.223 | 0.308 | 0.279 | 0.233 | 0.318 |
| ×8 | 0.173 | 0.191 | 0.177 | 0.181 | 0.200 | 0.193 |
| ×10 | 0.121 | 0.083 | 0.141 | 0.136 | 0.107 | 0.163 |

*Pupil diameter = 14.4 mm
Given as a weighted three wavelength accumulated measurement, the wavelengths being 8.5, 10.0 and 11.5 micrometers and the weights being 0.63, 1.00 and 0.50 respectively.
Maximum field angle at pupil = 46.4°.

TABLE III

| Lens | Surface | Separation | Magnification | Radius of Curvature | Material | Maximum Aperture Diameter |
|---|---|---|---|---|---|---|
| Pupil* | 0 | 0 | any | Flat | Air | 11.30 |
| A | 1 | 19.50 | any | −47.12 | Air | 18.43 |
|  | 2 | 3.80 | any | −37.97 | Ge | 19.50 |
| B | 3 | 0.50 | any | 163.58 | Air | 21.03 |
|  | 4 | 3.60 | any | −2583.94 | Ge | 20.93 |
| C | 5 | 0.50 | any | 28.17 | Air | 19.19 |
|  | 6 | 7.27 | any | 23.04 | Ge | 15.26 |
| D | 7 | 49.46 | any | 825.50 | Air | 22.76 |
|  | 8 | 3.50 | any | −662.43 | Ge | 22.91 |
| E | 9 | 25.36 | any | −201.68 | Air | 25.52 |
|  | 10 | 2.50 | any | −761.11 | Ge | 25.97 |
| F | 11 | 6.76 | any | −113.54 | Air | 27.55 |
|  | 12 | 5.20 | any | −73.17 | Ge | 28.38 |
| G | 13 | 0.50 | any | 180.34 | Air | 27.67 |
|  | 14 | 4.70 | any | 1109.73 | Ge | 27.27 |
| H | 15 | 47.58 | ×2.65 | −1986.54 | Air | 25.00 |
|  |  | 35.96 | ×5.30 |  |  |  |
|  |  | 24.39 | ×7.95 |  |  |  |
|  |  | 14.19 | ×10.60 |  |  |  |
|  |  | 5.25 | ×13.25 |  |  |  |
|  | 16 | 2.30 | any | 151.64 | Ge | 24.57 |
| I | 17 | 23.54 | ×2.65 | −122.78 | Air | 27.42 |
|  |  | 12.66 | ×5.30 |  |  |  |
|  |  | 16.86 | ×7.95 |  |  |  |
|  |  | 24.38 | ×10.60 |  |  |  |
|  |  | 32.44 | ×13.25 |  |  |  |
|  | 18 | 2.30 | any | −256.79 | Ge | 28.18 |
| J | 19 | 2.30 | any | −303.94 | Air | 29.37 |
|  | 20 | 2.30 | any | −1010.46 | ZnSe | 30.24 |
| K | 21 | 46.38 | ×2.65 | −235.46 | Air | 77.76 |
|  |  | 68.88 | ×5.30 |  |  |  |
|  |  | 76.25 | ×7.95 |  |  |  |
|  |  | 78.93 | ×10.60 |  |  |  |
|  |  | 79.81 | ×13.25 |  |  |  |
|  | 22 | 13.50 | any | −155.60 | Ge | 79.84 |

*Maximum field angle at pupil = 72°.

TABLE IV

Approximate R.M.S. Spot Sizes in Object Space* (milliradians)

| | Monochromatic at 10.0 micrometers | | | Polychromatic over 8.5–11.5 micrometers | | |
|---|---|---|---|---|---|---|
| | Field position as a fraction of the full field at pupil # | | | | | |
| Magnification | 0 | 0.4 | 0.8 | 0 | 0.4 | 0.8 |
| ×2.65 | 0.899 | 0.492 | 1.238 | 0.926 | 0.553 | 1.293 |
| ×5.30 | 0.425 | 0.303 | 0.576 | 0.430 | 0.312 | 0.580 |
| ×7.95 | 0.257 | 0.213 | 0.322 | 0.257 | 0.220 | 0.330 |
| ×10.60 | 0.134 | 0.148 | 0.128 | 0.142 | 0.157 | 0.148 |
| ×13.25 | 0.171 | 0.087 | 0.159 | 0.180 | 0.106 | 0.178 |

*Pupil diameter = 10 mm.
Given as a weighted three wavelength accumulated measurement, the wavelengths being 8.5, 10.0 and 11.5 micrometers and the weights being 0.63, 1.00 and 0.50 respectively.
Maximum field angle at pupil = 72°.

TABLE V

| Material | Refractive Index* | V-value # |
|---|---|---|
| BS2 | 2.85632 | 248 |
| BSA | 2.77917 | 209 |
| TI 1173 | 2.60010 | 142 |
| AMTIR 1 | 2.49745 | 169 |
| BS1 | 2.49158 | 152 |
| TI20 | 2.49126 | 144 |
| ZnSe | 2.40653 | 77 |
| KRS 5 | 2.37044 | 260 |
| CsI | 1.73933 | 316 |
| CsBr | 1.66251 | 176 |
| KI | 1.62023 | 137 |

*Refractive index is for a wavelength of 10 micrometers.
Over the wavelength range 8.5–11.5 micrometers.

What is claimed is:

1. An infrared afocal refractor telescope comprising a zoom system, a collecting system and an eyepiece system aligned on a common optical axis, the zoom system being arranged to accept from object space radiation in the infrared waveband, the collecting system being arranged to form a real image from radiation delivered thereto by said zoom system, and the eyepiece system being arranged to deliver radiation from said image to a pupil in image space wherein said collecting system is formed by a single lens component which is fixedly located on said optical axis and said zoom system is formed by an objective lens component fixedly located on said optical axis and by first and second other lens components mounted on respective carriages and separately selectively positionable along said optical axis between said objective lens component and said single lens component, said first and second other lens components each having the same sign of optical power, said objective lens component having positive optical power, the variation in telescope magnification provided by selective positioning of said first and second other lens components being at least 5:1 in range, the locus of movement of said first and said second other lens component being substantially free of curl back, the arrangement being such that relatively small positional adjustments of said first and second other lens components renders the telescope athermalised.

2. A telescope as claimed in claim 1, wherein said first and second other lens components each have negative optical power.

3. A telescope as claimed in claim 1, wherein each component of said zoom system is formed by a single lens element.

4. A telescope as claimed in claim 1, and having the parameter values set forth in the following Table, with the maximum field angle at pupil=46.4°:

| Lens | Surface | Separation | Magnification | Radius of Curvature | Material | Maximum Aperture Diameter |
|---|---|---|---|---|---|---|
| Pupil | 0 | 0 | any | Flat | Air | 15.30 |
| A | 1 | 33.21 | any | −68.58 | Air | 21.13 |
|  | 2 | 3.30 | any | −56.90 | Ge | 21.91 |
| B | 3 | 0.50 | any | 246.13 | Air | 22.85 |
|  | 4 | 3.80 | any | 14792.96 | Ge | 22.76 |
| C | 5 | 0.50 | any | 38.61 | Air | 21.87 |
|  | 6 | 10.07 | any | 34.19 | Ge | 17.57 |
| E | 9 | 73.92 | any | −233.38 | Air | 23.58 |
|  | 10 | 2.50 | any | −525.64 | Ge | 24.00 |
| F | 11 | 12.82 | any | −132.08 | Air | 28.45 |
|  | 12 | 5.10 | any | −78.31 | Ge | 29.15 |
| G | 13 | 0.50 | any | 176.02 | Air | 28.27 |
|  | 14 | 4.40 | any | 636.75 | Ge | 27.87 |
| H | 15 | 47.14 | ×2 | −1986.54 | Air | 25.40 |
|  |  | 35.89 | ×4 |  |  |  |
|  |  | 24.56 | ×6 |  |  |  |
|  |  | 14.50 | ×8 |  |  |  |
|  |  | 5.65 | ×10 |  |  |  |
|  | 16 | 2.30 | any | 151.64 | Ge | 24.93 |
| I | 17 | 24.78 | ×2 | −122.78 | Air | 27.78 |
|  |  | 13.25 | ×4 |  |  |  |
|  |  | 17.00 | ×6 |  |  |  |
|  |  | 24.25 | ×8 |  |  |  |
|  |  | 32.16 | ×10 |  |  |  |
|  | 18 | 2.30 | any | −256.79 | Ge | 28.57 |
| J | 19 | 2.30 | any | −303.94 | Air | 29.83 |
|  | 20 | 2.30 | any | −1010.46 | ZnSe | 30.69 |
| K | 21 | 45.58 | ×2 | −235.46 | Air | 77.48 |
|  |  | 68.36 | ×4 |  |  |  |
|  |  | 75.94 | ×6 |  |  |  |
|  |  | 78.75 | ×8 |  |  |  |
|  |  | 79.69 | ×10 |  |  |  |
|  | 22 | 13.50 | any | −155.60 | Ge | 79.51 |

5. A telescope as claimed in claim 1, and having the parameter values set forth in the following Table with the maximum field angle at pupil=72°:

| Lens | Surface | Separation | Magnification | Radius of Curvature | Material | Maximum Aperture Diameter |
|---|---|---|---|---|---|---|
| Pupil | 0 | 0 | any | Flat | Air | 11.30 |
| A | 1 | 19.50 | any | −47.12 | Air | 18.43 |
|  | 2 | 3.80 | any | −37.97 | Ge | 19.50 |
| B | 3 | 0.50 | any | 163.58 | Air | 21.03 |
|  | 4 | 3.60 | any | −2583.94 | Ge | 20.93 |
| C | 5 | 0.50 | any | 28.17 | Air | 19.19 |
|  | 6 | 7.27 | any | 23.04 | Ge | 15.26 |
| D | 7 | 49.46 | any | 825.50 | Air | 22.76 |
|  | 8 | 3.50 | any | −662.43 | Ge | 22.91 |
| E | 9 | 25.36 | any | −201.68 | Air | 25.52 |
|  | 10 | 2.50 | any | −761.11 | Ge | 25.97 |
| F | 11 | 6.76 | any | −113.54 | Air | 27.55 |
|  | 12 | 5.20 | any | −73.17 | Ge | 28.38 |
| G | 13 | 0.50 | any | 180.34 | Air | 27.67 |
|  | 14 | 4.70 | any | 1109.73 | Ge | 27.27 |
| H | 15 | 47.58 | ×2.65 | −1986.54 | Air | 25.00 |
|  |  | 35.96 | ×5.30 |  |  |  |
|  |  | 24.39 | ×7.95 |  |  |  |
|  |  | 14.19 | ×10.60 |  |  |  |
|  |  | 5.25 | ×13.25 |  |  |  |
|  | 16 | 2.30 | any | 151.64 | Ge | 24.57 |
| I | 17 | 23.54 | ×2.65 | −122.78 | Air | 27.42 |
|  |  | 12.66 | ×5.30 |  |  |  |
|  |  | 16.86 | ×7.95 |  |  |  |
|  |  | 24.38 | ×10.60 |  |  |  |
|  |  | 32.44 | ×13.25 |  |  |  |
|  | 18 | 2.30 | any | −256.79 | Ge | 28.18 |
| J | 19 | 2.30 | any | −303.94 | Air | 29.37 |
|  | 20 | 2.30 | any | −1010.46 | ZnSe | 30.24 |
| K | 21 | 46.38 | ×2.65 | −235.46 | Air | 77.76 |
|  |  | 68.88 | ×5.30 |  |  |  |
|  |  | 76.25 | ×7.95 |  |  |  |
|  |  | 78.93 | ×10.60 |  |  |  |
|  |  | 79.81 | ×13.25 |  |  |  |
|  | 22 | 13.50 | any | −155.60 | Ge | 79.84 |

* * * * *